United States Patent [19]

Ichiyanagi

[11] Patent Number: 5,557,715
[45] Date of Patent: Sep. 17, 1996

[54] IMAGE PROCESSING DEVICE WHICH DESIGNATES MEMORY LOCATIONS BY USING X/Y COORDINATES OF AN IMAGE

[75] Inventor: Yoshio Ichiyanagi, Kanagawa, Japan

[73] Assignee: Fuji Xerox Co., Ltd., Tokyo, Japan

[21] Appl. No.: 246,072

[22] Filed: May 19, 1994

[30] Foreign Application Priority Data

May 20, 1993 [JP] Japan .................... 5-118802

[51] Int. Cl.⁶ .................................................... G06F 15/00
[52] U.S. Cl. ............................................................ 395/137
[58] Field of Search ............................. 395/133, 136, 395/137, 113, 114, 118, 126, 121

[56] References Cited

U.S. PATENT DOCUMENTS

4,929,085   5/1990   Kajihara .................... 364/518
5,081,700   1/1992   Crozier ..................... 395/150
5,396,607   3/1995   Shimatani ................. 395/400

*Primary Examiner*—Phu K. Nguyen
*Attorney, Agent, or Firm*—Finnegan, Henderson, Farabow, Garrett & Dunner, L.L.P.

[57] ABSTRACT

Image information and area information associated therewith are connected to each other to produce connected image information. Memory addresses are generated to allow the connected image information to be stored into a memory through coordinates X and Y. The connected image information is rotated based on the memory addresses thus generated. The rotated image information is combined with the image information in the memory.

13 Claims, 10 Drawing Sheets

Y (MAIN SCANNING)
X (SUB-SCANNING)
8 PIXELS
8 PIXELS

FIG. 4(a)

FOR EXPANSION
BLACK CHARACTER
CHARACTER/PHOTOGRAPH
8 PIXELS
8 PIXELS
Y (MAIN SCANNING)
X (SUB-SCANNING)

IMAGE PROCESSING DEVICE WHICH DESIGNATES MEMORY LOCATIONS BY USING X/Y COORDINATES OF AN IMAGE

BACKGROUND OF THE INVENTION

The present invention relates to an image processing device which performs editing operations on an image stored in a memory.

In general, image editing is performed such that subject image information is stored in a memory and then image editing operations such as extraction, deletion and movement are performed on the image information thus stored. In storing image information into a memory, addresses of the memory are allocated to X and Y coordinates of respective pixels constituting the image, and the image information is stored into the memory so as to be two-dimensionally developed thereon. In an editing operation, for instance, movement, destination addresses of the memory are calculated, and original image data are written to those addresses.

Memory address control devices of the above type for storing into a memory and editing two-dimensional image information using its X ond Y coordinates are disclosed in Japanese Patent Application Unexamined Publication Nos. Sho. 58-1262, Sho. 59-151258 and Hei. 1-251286. However these devices have the following disadvantages.

In the conventional technique disclosed in the publication Sho. 58-1262, multiplication is effected by shifting data toward the LSB or MSB. Therefore, the memory width in the Y direction is limited by a power of 2.

Although the memory width is not limited by a power of 2 in the conventional technique of the publication Sho. 59-151258, fixed-length data on an x-y plane is processed in this technique.

In the conventional technique of the publication Hei. 1-251286, since image information to be rotated should be sent in a manner depending on a rotation angle, it is not applicable to, for instance, a raster image as sent from an image reading device etc., in which case the order of sending image information to be rotated is fixed.

Further, there have been proposed some techniques of storing image information into a three-dimensional memory. However, in writing arbitrary image information into a three-dimensional memory, a relationship between a length in the depth direction of the three-dimensional memory and the quantity of image information is not considered. Therefore, memory addresses of first one-byte portions of arbitrary coordinates (X, Y) are calculated one by one based on proper reference coordinates in a proper scanning order.

SUMMARY OF THE INVENTION

An object of the present invention is to provide an image processing device which specifies positions on a memory of pieces of information having varying data lengths using their X and Y coordinates without being suffered from a problem that the memory width in the Y direction is limited by a power of 2, and which can perform editing operations such as rotation and combining.

To attain the above object, according to the invention, an image processing device for processing image information and area information associated therewith and storing the processed information into a memory, comprises:

means for connecting the image information and the associated area information to produce connected image information;

means for generating memory addresses so as to allow the connected image information to be stored into the memory through coordinates X end Y;

means for rotating the connected image information based on the memory addresses; and means for combining the rotated image information with the image information on the memory.

Figure 1:
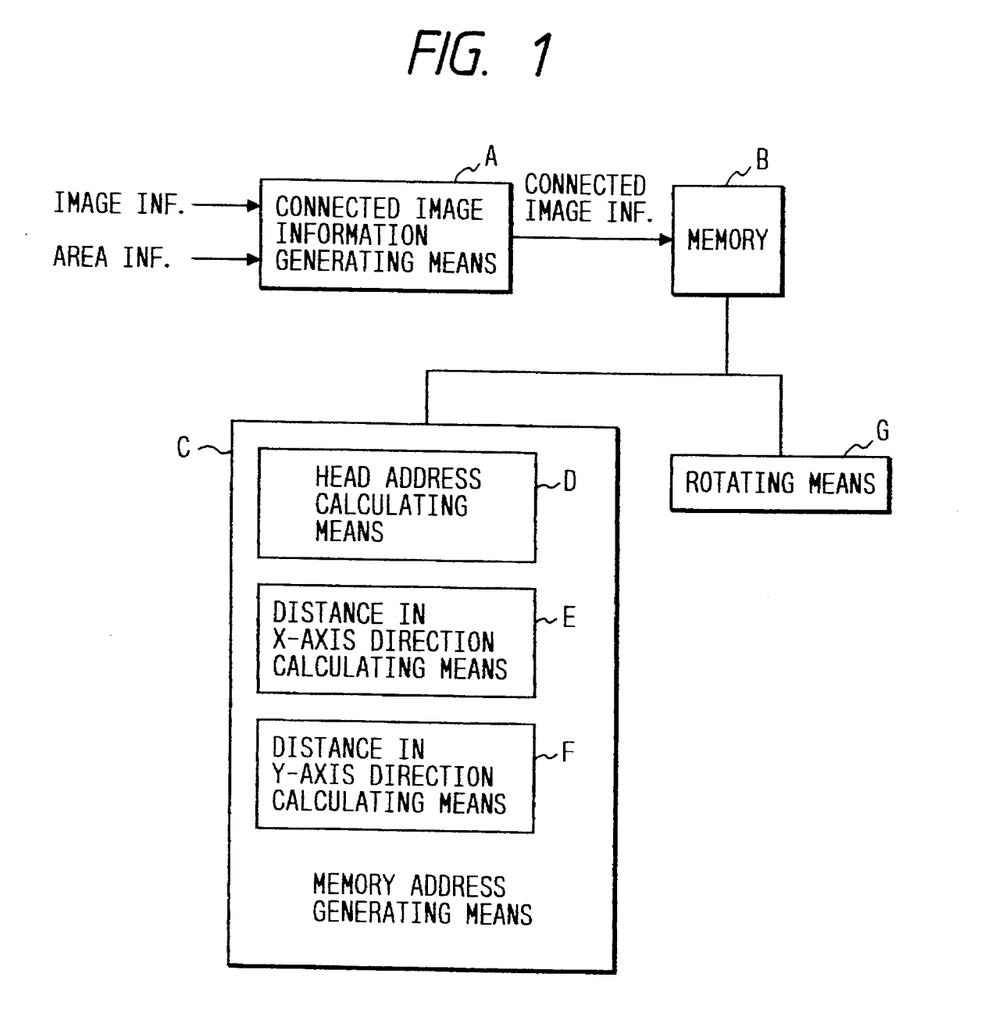
FIG. 1 illustrates the conceptual constitution of an image processing device according to the present invention.

Referring to a conceptual diagram of FIG. 1, the operation of the above image processing device will be described below in a specific manner.

The image processing device includes a connected image information generating means A for connecting image information obtained by coding image information as divided into blocks of a predetermined size and area information associated with the coded image information to produce connected image information, and a memory address generating means C for generating memory addresses so as to allow the connected image information to be stored into a memory B through coordinates (X, Y). The memory address generating means C has a head address calculating means D for calculating a head address of a block corresponding to coordinate values, a distance in X-axis direction calculating means E and a distance in Y-axis direction calculating means F for calculating distances of adjacent coordinate values from the head address of the block. The image processing device further has a means (not shown) for including trimming designation information into the area information.

The image information obtained by coding image information as divided into blocks of a predetermined size and the associated area information are connected by the connected image information generating means A to produce the connected image information. The head address a block, which corresponds to the coordinates (X, Y) on the memory B as designated by a user in advance, is generated by the head address calculating means D. The distances in the X-axis and Y-axis directions indicating the distances of the adjacent coordinate values from the head address of the block are generated by the distance in X-axis direction calculating means E and the distance in Y-axis direction calculating means F. In this manner, memory addresses can be generated sequentially in accordance with the connected image information. The distances in the X-axis and Y-axis directions vary with the rotation angle. A rotating means G generates real addresses to be used for writing rotated image information into the memory B based on the above-calculated head address and distances in the X-axis and Y-axis directions. Since the trimming designation information is included in the area information, it is possible to perform a combining operation with trimming on the memory B.

According to the invention, when an editing operation is attempted in an image processing device in which area information as well as image information is coded as blocks and coded image information is stored in a memory together with coded area information, the complexity of read/write control of the memory, for instance, memory address calculation for the editing operation, which would otherwise be caused by a large variation of code lengths of the connected information, can be eliminated. Further, since the memory is controlled using two-dimensional addresses that do not depend on the code amount, addresses of particular image information do not vary even if the compression ratio is changed.

DESCRIPTION OF THE PREFERRED EMBODIMENTS

The present invention will be hereinafter described by way of an embodiment with reference to the accompanying drawings.

Figure 2:
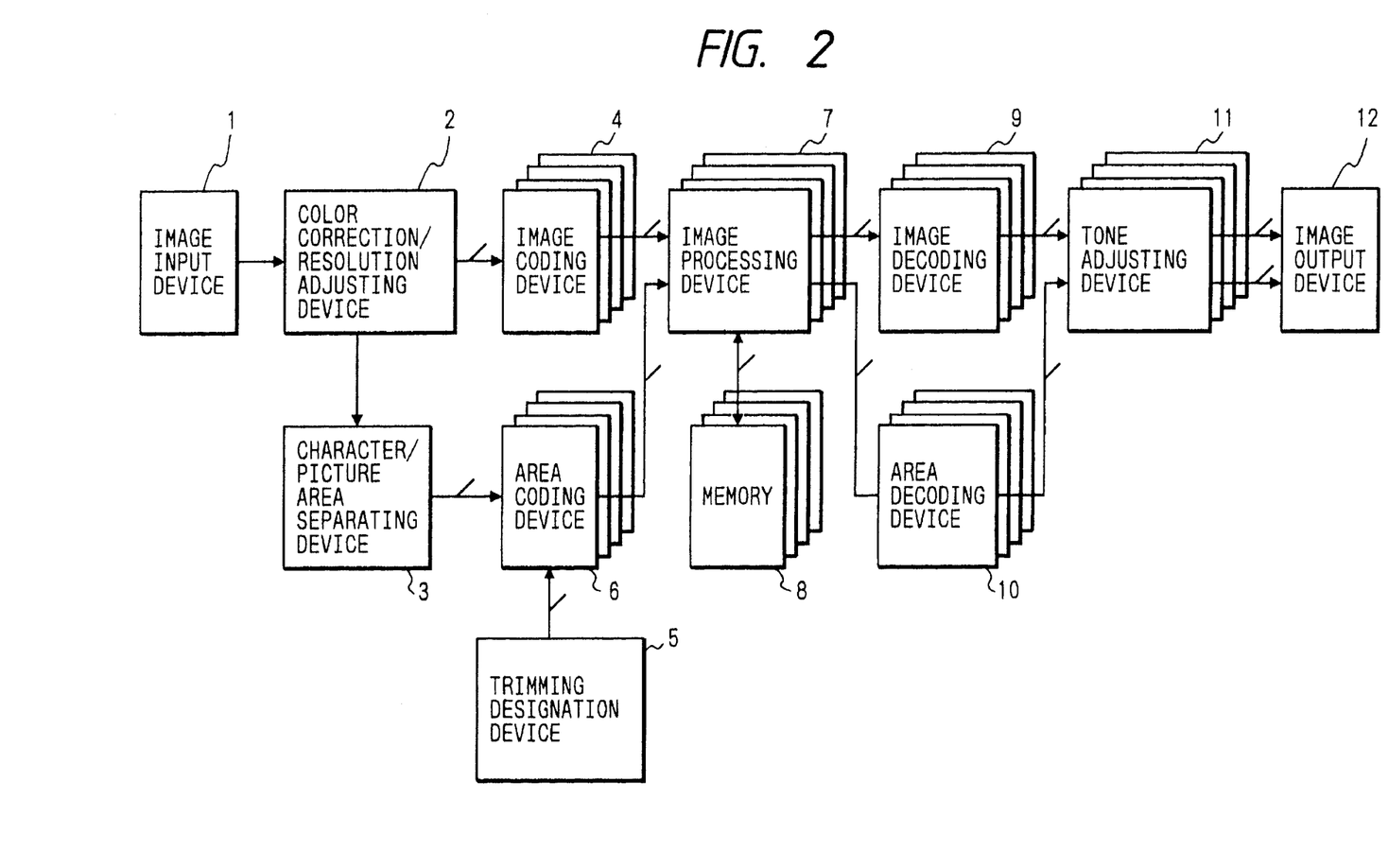
FIG. 2 is a block diagram showing the entire system of a full-color digital copier including the image processing device of the invention.

FIG. 2 is a block diagram showing the entire system of a full-color digital copier including an image processing device according to the invention. A color correction/resolution adjusting device 2 converts BGR (blue, green and red) image information of a document produced by an image input device 1 to YMC (yellow, magenta and cyan) image information and K (black information) image information that conform to characteristics of an image output device (described later). The color correction/resolution adjusting device 2 further eliminates more from a mesh-point image and emphasizes resolution of a line (character) image. Based on the image information sent from the color correction/resolution adjusting device 2, a character/picture area separating device 3 generates area signals such as a character/photograph signal indicating a kind of image and a black character signal. An image coding device 4 divides the image information into blocks each having a size of N×N, and performs coding with a predetermined code length. A trimming designation device 5 generates a trimming signal indicating trimming of an arbitrary form using an external two-dimensional area designating means (not shown). An area coding device 6 divides the area information into blocks each having a size of N×N, and performs coding of a predetermined length, and adds the trimming signal to the part of the area information. An image processing device 7 combines the coded image information and the coded area information, stores the combined information into a memory 8, and performs operations such as rotation and combining with trimming.

When having finished operations with the memory 8 and receiving a print-out instruction, the image processing device 7 reads combined image information from the memory 8 and separates it into coded image information and coded area information, which are restored to the original image information and area signals by an image decoding device 9 and an area decoding device 10, respectively. A tone adjusting device 11 performs a tone adjustment to render the image information compatible with an image output device 12. Further, the tone adjusting device 11 outputs only the K image signal and clears the YMC image signals when the black character signal of the area signals turns active. The image output signal 12 records the image signals on a recording sheet, in which the number of output lines are switched between two numbers in accordance with the character/photograph signal of the area signals. Since the four pieces of YMCK image information need to be processed in parallel, each of the image coding device 4, area coding device 6, image processing device 7, image decoding device 9 and tone adjusting device 11 consists of the four identical circuits.

The entire system of FIG. 2 is program-controlled through control lines (not shown). Read/write control of the memory 8 through the control lines is performed using two-dimensional addresses (described later).

Figure 3:
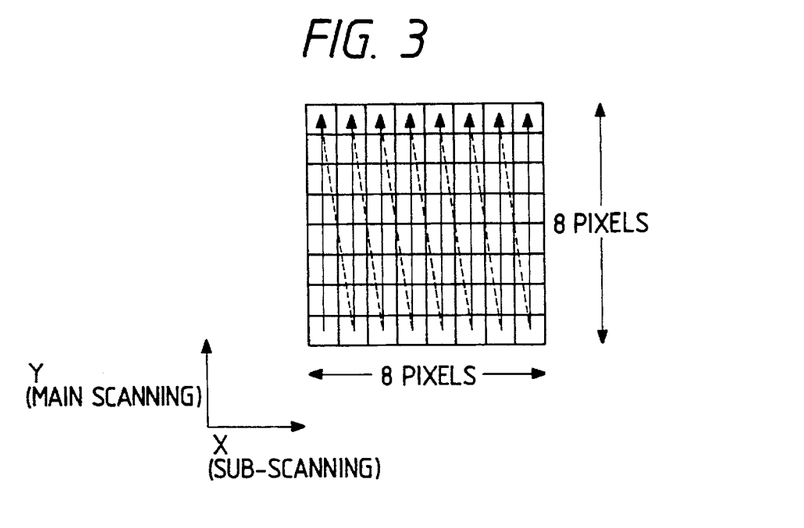
FIG. 3 illustrates how image information is divided into blocks in an image coding device.

FIG. 3 illustrates how the image coding device 4 (see FIG. 2) divides the image information into blocks. The image information of each color in which each pixel is represented by 8 bits (1 byte, 256 gradations) is divided into blocks each including 8×8 pixels in the main scanning and sub-scanning directions. While the quantity of data per block is 64 bytes, the image coding device 4 of this embodiment performs coding by use of 6 kinds of compression rates shown in Table 1. That is, the one-block code amount is controlled to be constant by selecting a compression rate.

TABLE 1

| Code length (bits per block) | Code length (bytes per block) | Compression rate |
| --- | --- | --- |
| 216 | 27 | 2.4 |
| 152 | 19 | 3.4 |
| 120 | 15 | 4.3 |
| 88 | 11 | 5.8 |
| 56 | 7 | 9.1 |
| 40 | 5 | 12.8 |

If a compression rate 2.4 is selected, image information of 64 bytes is coded into image information of 27 bytes. The compression rate is fixed in one page, i.e., does not vary with the position of a block.

Figure 4A:
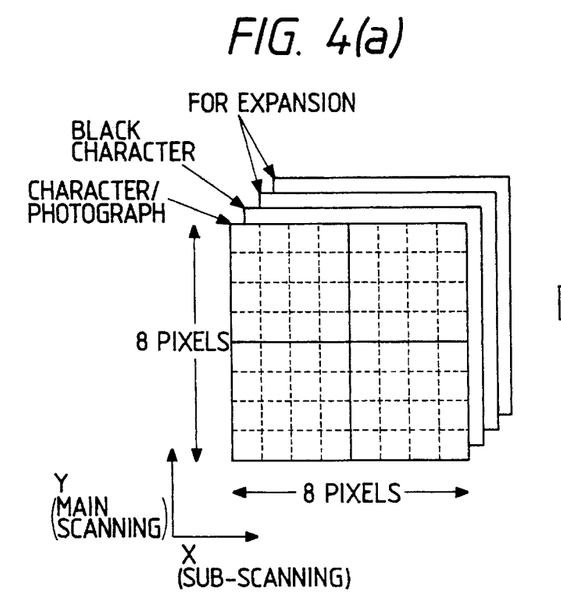
FIGS. 4(a) and 4(b) illustrate how area information is coded in an area coding device.
Figure 4B:
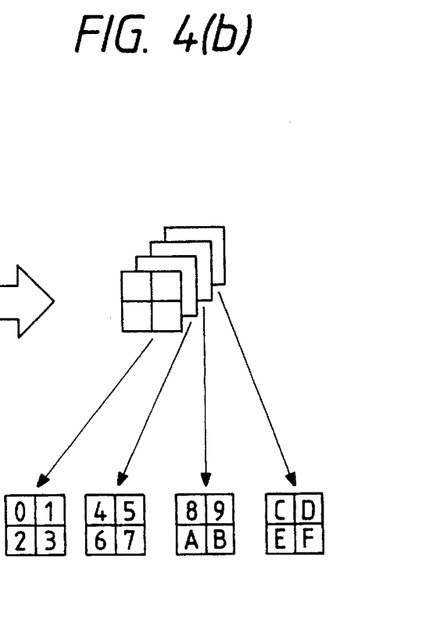

FIG. 4 illustrates how the area coding device 6 (see FIG. 2) codes the area information. In this embodiment, there are used four 1-bit planes: one 1-bit plane for each of the character/photograph signal and the black character signal, and two 1-bit planes for future expansion of the area signals. Each area information is divided into blocks each having an 8×8 size (see part (a) of FIG. 4), and each block is further divided into sub-blocks each having a 4×4 size. Each sub-block of 16 bits is coded into information of 1 bit (see part (b) of FIG. 4). That is, one-block information of 64 bits is coded into information of 4 bits. Thus, the total data quantity is reduced to 4 bits×4 planes=16 bits, i.e., 2 bytes. Symbols 0–F in part (b) of FIG. 4 correspond to the respective bits of the 16-bit data.

Figure 5:
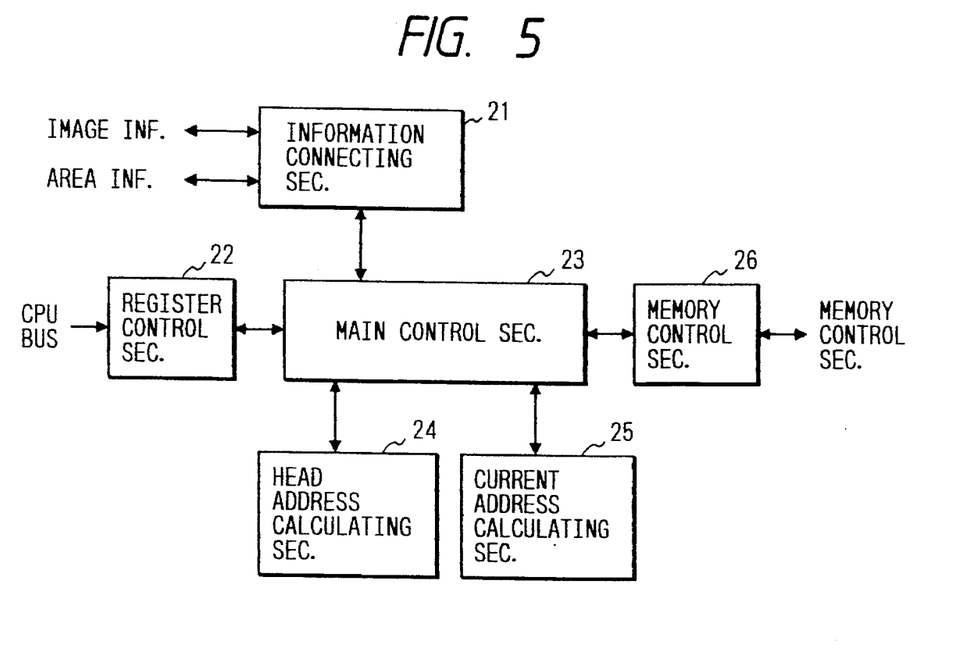
FIG. 5 is a block diagram showing a configuration of the image processing device of the invention.

FIG. 5 is a block diagram showing the entire configuration of the image processing device 7 (see FIG. 2). An information connecting section 21 performs input/output of the image information and the area information, and connects those. Accessed through a CPU bus, a register control section 22 controls registers incorporated therein, such as a parameter register for setting coordinates etc. and a command register for instructing suspension of activation. A main control section 23 performs the entire sequence control. A head address calculating section 24 calculates a head address and distances in the x-axis and y-axis directions of a block. A current address calculating section 25 calculates a real address to be given to the memory 8 for each input or output of image information. A memory control section 26 generates a DRAM (dynamic random access memory) control signal, a DRAM refresh signal, etc.

Figure 6:
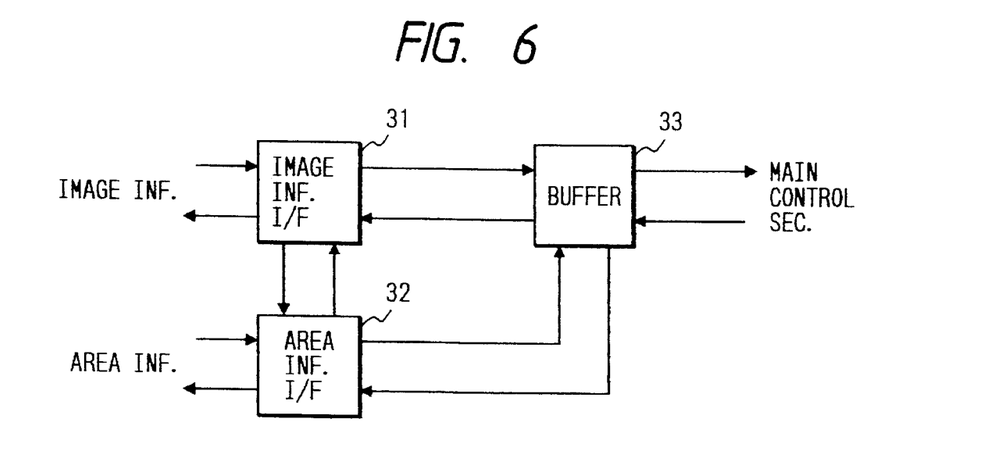
FIG. 6 is a block diagram showing a configuration of an information connecting section.

FIG. 6 is a block diagram of the information connecting section 21 shown in FIG. 5. An image information interface 31 performs input/output control of the image information. An area information interface 32 performs input/output control of the area information. A buffer 33 takes synchronism with a DRAM serving as the memory 8 (see FIG. 2).

Figure 7:
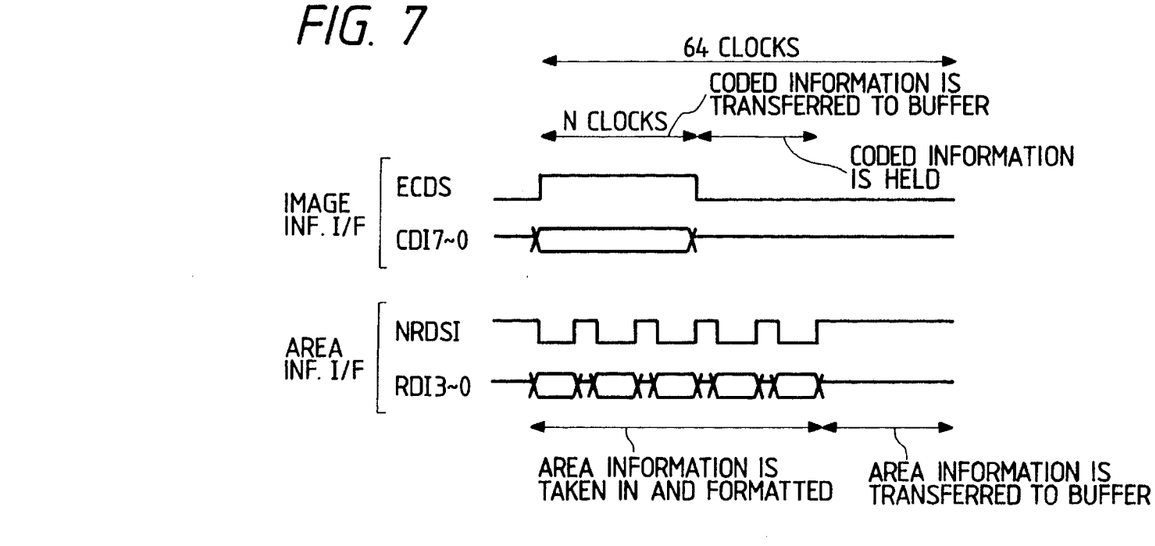
FIG. 7 is a time chart showing an operation performed by the information connecting section when information is input thereto.

FIG. 7 is a time chart showing an operation of the information connecting section 21 (see FIG. 6) when it receives information. If it is assumed that one data is transferred by one clock, the information connecting section 21 takes a processing time of 64 clocks to receive 1-block data, which has a 8×8 size. CDI7-0 represent image information, which is effective while ECDS is HIGH. The number of clocks corresponding to a period in which ECDS is HIGH is equal to the code length after the compression. The image information interface 31 sequentially transfers input image information to the buffer 33, and holds it when information corresponding to a predetermined number N of clocks has been transferred. The area information interface 32 operates in parallel with the image information interface 31. RDI3-1 represent area information, which is effective while NRDSI is LOW. The area information is sent five times in total, by 4 bits at a time. The area information interface 32 combines the input area information into 8-bit data, and transfers the input area information to the buffer 33 when 16-bit data has been collected.

Figure 8:
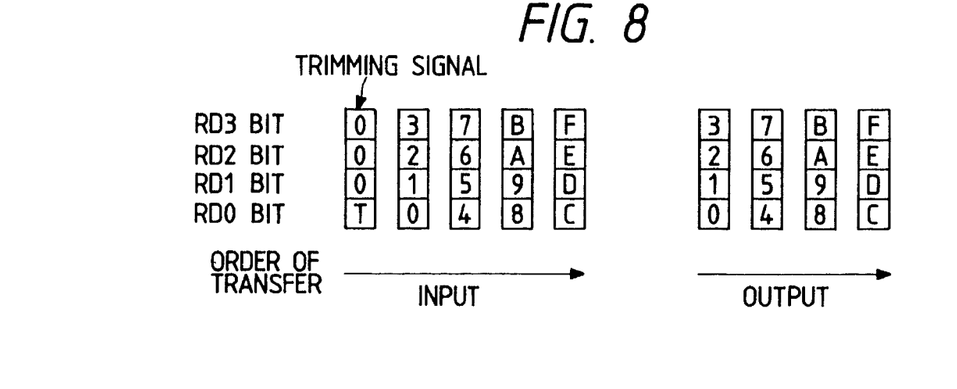
FIG. 8 illustrates a transfer format of the area information.

FIG. 8 shows a detailed transfer format of the area information. Values 0–F are the same as those shown in part (b) of FIG. 4. As shown in an input transfer format, a bit T indicates a trimming signal for one block that has been supplied from the trimming designation device 5 (see FIG. 2) and added at the head of area information by the area coding device 6. The writing to the memory 8 is permitted if the bit T is 1, and is prohibited if it is 0. This enables a combining operation with trimming to be performed on a block-by-block basis.

Figure 9:
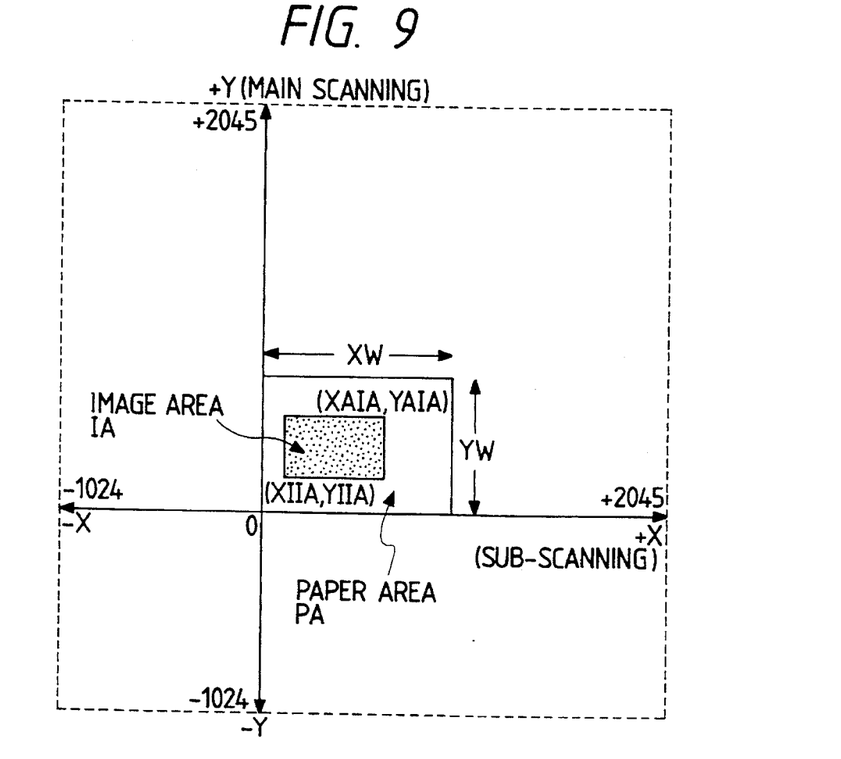
FIG. 9 illustrates a configuration of an X/Y coordinate system.

FIG. 9 illustrates an example of constituting an X/Y coordinate system used in the image processing device 7 of this embodiment. An area defined by XW and YW and occupying a top-right portion with respect to the origin O is called a paper area PA. A rectangular area having minimum coordinates (XIIA, YIIA) and maximum coordinates (XAIA, YAIA) is called an image area IA. The image input/output operation with an external system is performed with the image area IA as a unit area. The paper area PA corresponds to actual memory elements, and only the image having coordinates located within the paper area PA is left on the memory 8.

Figure 10:
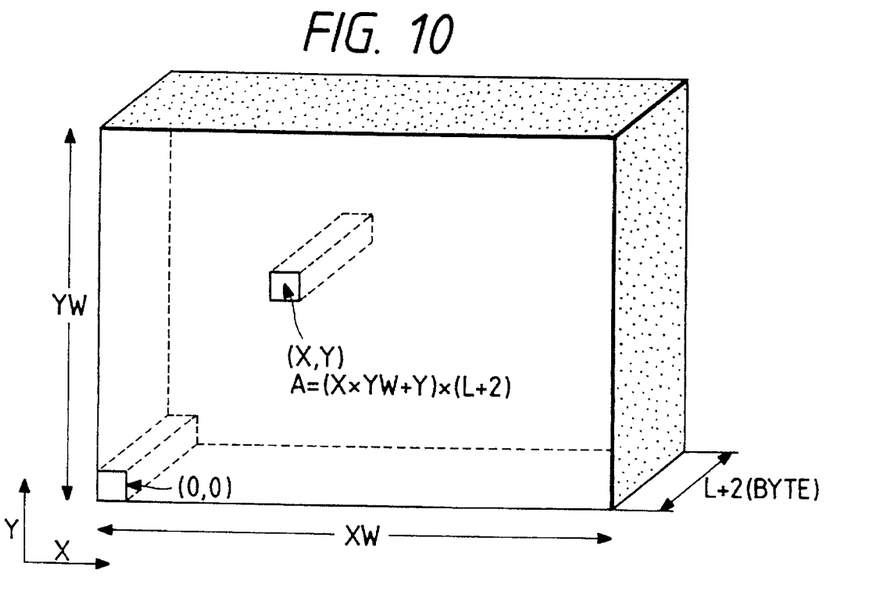
FIG. 10 illustrates a relationship between coordinates (X, Y) and a memory address.

FIG. 10 illustrates a relationship between coordinates (X, Y) of an image and a memory address. An address A is calculated such that $$A=(X \times YW+Y)(L+2) \qquad (1)$$

In FIG. 10, XW and YW are widths of the paper area PA in the X and Y directions, respectively, and L is a code length shown in FIG. 3.

Figure 11:
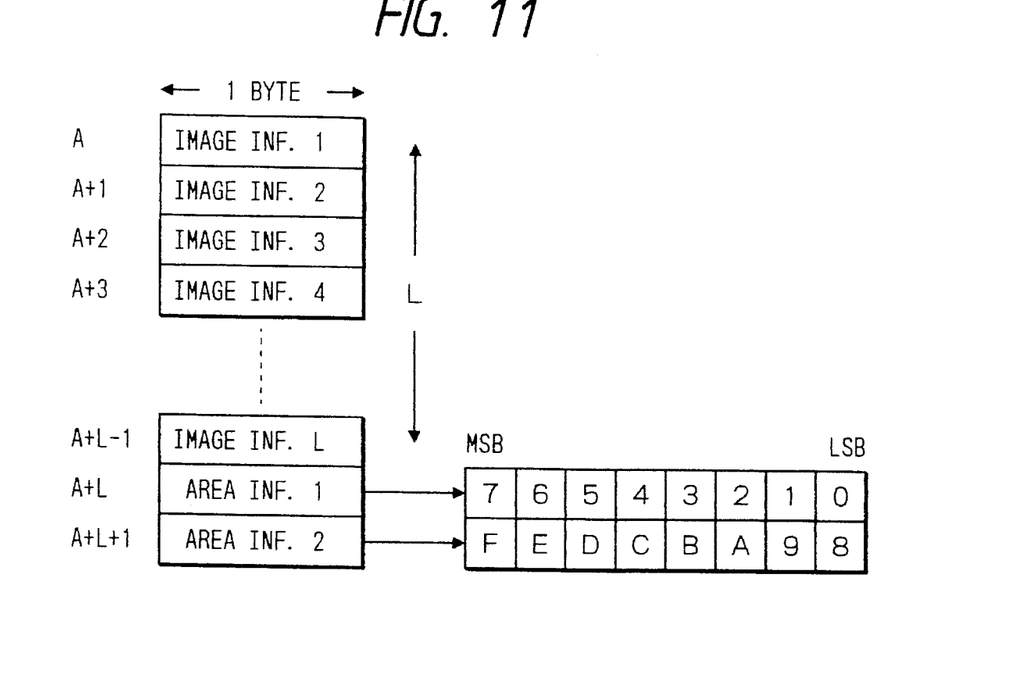
FIG. 11 illustrates a relationship between the memory address and the image and area information.

FIG. 11 shows a relationship between the memory address and the image information (L bytes) and area information (2 bytes). Symbols 0–F of the area information are the same as those shown in FIGS. 4 and 8.

Figure 12:
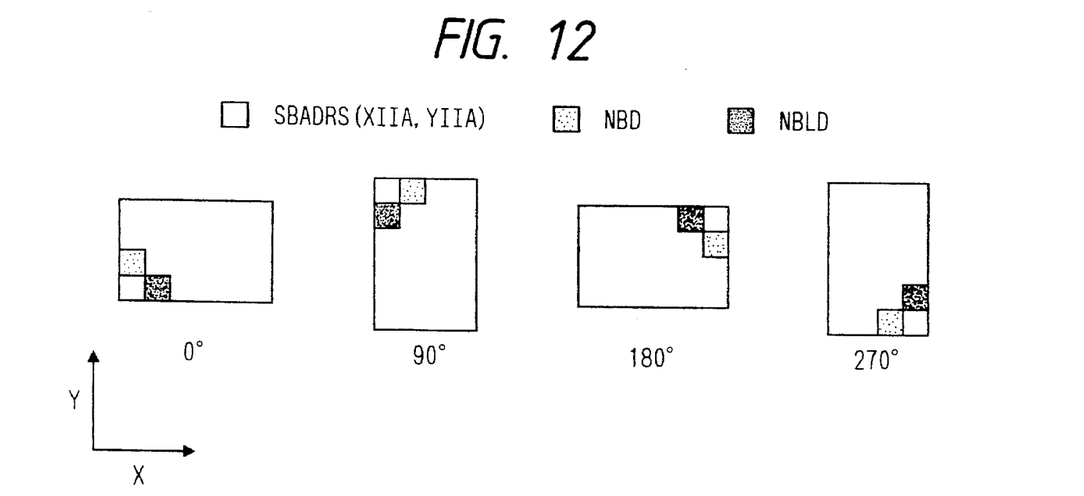
FIG. 12 illustrates a head address and distances in the X-axis and Y-axis directions.

FIG. 12 shows a positional relationship between a head address SBADRS that corresponds to the minimum coordinates (XIIA, YIIA) of the image area IA and a next block distance NBD and a next block line distance NBLD indicating distances in the X-axis and Y-axis directions, all of which are calculated by the head address calculating section 24 (see FIG. 5).

The head address SBADRS is calculated in the same manner as the address A. That is, according to Equation (1), it is calculated as $$SBADRS=(XIIA \times YW+YIIA)(L+2).$$

The next block distance NBD and the next block line distance NBLD are calculated in accordance with the rotation angle in the following manner.
When the rotation angle is 0°, $$NBD=L+2$$

$$NBLD=(L+2)YW.$$

When the rotation angle is 90°, $$NBD=(L+2)YW$$

$$NBLD=-(L+2).$$

When the rotation angle is 180°, $$NBD=-(L+2)$$

$$NBLD=-(L+2)YW.$$

When the rotation angle is 270°, $$NBD=-(L+2)YW$$

$$NBLD=L+2.$$

To execute a rotating operation, the inside of a block needs to be rotated in advance in the image coding device 4 (see FIG. 2).

Figure 13:
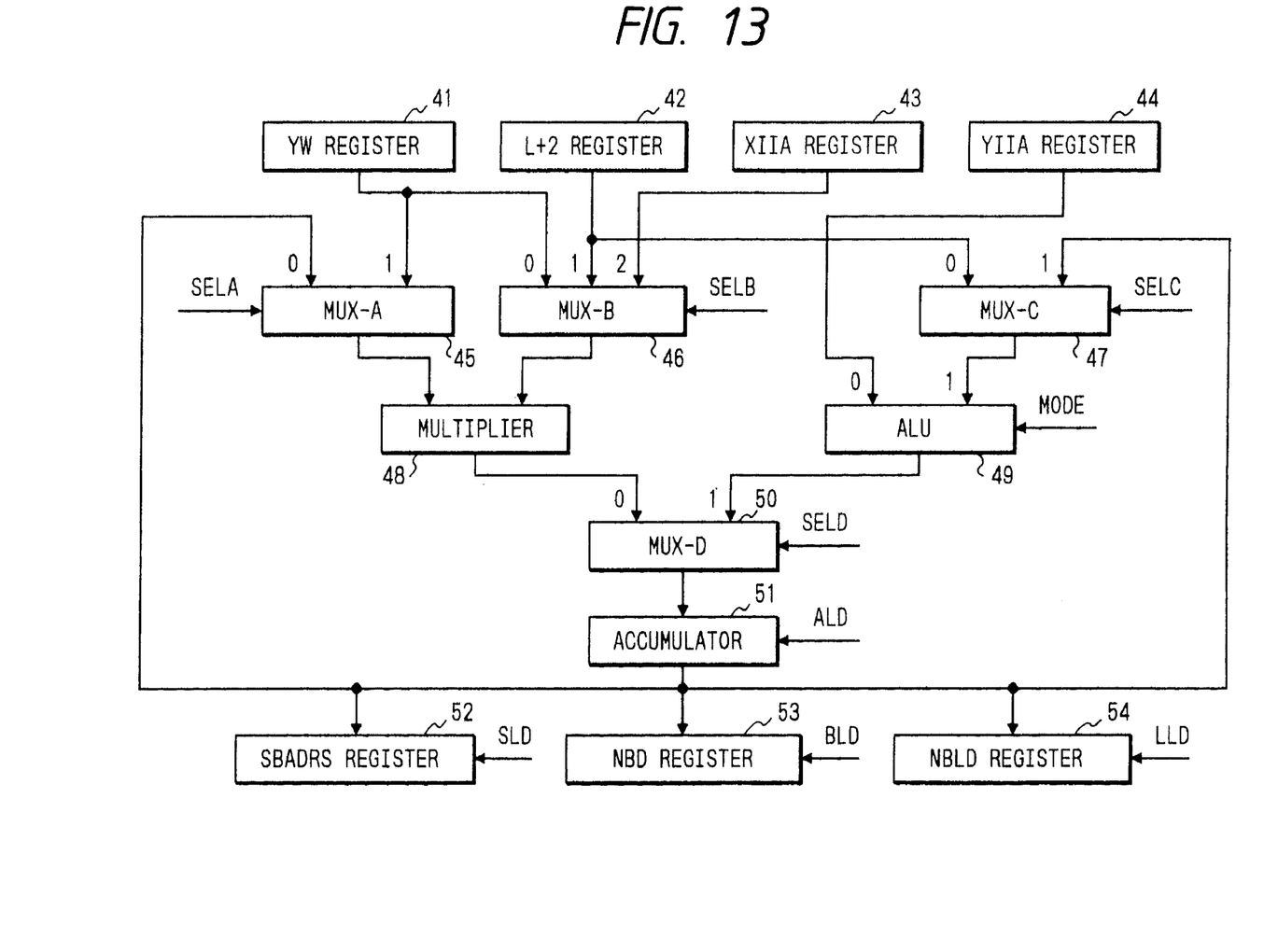
FIG. 13 is a block diagram showing a configuration of a head address calculating section.

FIG. 13 is a block diagram showing a configuration of the head address calculating section 24 (see FIG. 5). It is assumed that the width YW in the Y direction of the paper area PA, a value (L+2) that is the code length plus 2, the minimum X coordinate XIIA of the image area IA, and the minimum Y coordinate YIIA of the image area IA are stored in advance in registers 41–44, respectively. A multiplexer-A (abbreviated as MUX-A in FIG. 13) 45 outputs a value from an accumulator 51 when SELA=1, and outputs a value from the YW register 41 when SELA=0. A multiplexer-B (abbreviated as MUX-B in FIG. 13) 46 outputs a value from the YW register 41 when SELB=0, outputs a value from the L+2 register 42 when SELB=1, and outputs a value from the XIIA register 43 when SELB=2. A multiplexer-C (abbreviated as MUX-C in FIG. 13) 47 outputs a value from the L+2 register 42 when SELC=0, and outputs the value of the accumulator 51 when SELC=1. A multiplier 48 multiplies together values of the multiplexer-A 45 and the multiplexer-B 46. An arithmetic-logic unit (abbreviated as ALU in FIG. 13) 49 adds together values of the inputs 0 and 1 when MODE=0, and reverses the sign of a value of the input 1 when MODE=1. A multiplexer-D (abbreviated as MUX-D in FIG. 13) 50 outputs a value from the multiplier 48 when SELD=0, and outputs a value from the arithmetic-logic unit 49 when SELD=1. The accumulator 51 stores a value of the multiplexer-D 50 when ALD is active. An SBADRS register 52 stores a value of the accumulator 51 when SLD is active. An NBD register 53 stores the value of the accumulator 51 when BLD is active. An ABLD register 54 stores the value of the accumulator 51 when LLD is active.

Referring to FIG. 13, a description will be made of how to calculate the head address SBADRS, next block distance NBD and next block line distance NBLD.

The head address SBADRS is calculated as follows.

Step 1: SELA=1, SELB=2, SELD=0, and ALD is made active. XIIA×YW is calculated, and a result is stored in the accumulator 51.

Step 2: SELC=1, SELD=1, MODE=0, and ALD is made active. XIIA×YW+YIIA is calculated, and a result is stored in the accumulator 51.

Step 3: SELA=0, SELB=1, and ALD is made active. (XIIA×YW+YIIA)(L+2) is calculated, and a result is stored in the accumulator 51.

Step 4: SLD is made active. The content of the accumulator 51 is sent to the SBADRS register 52.

The next block distance NBD is calculated as follows when the rotation angle is 180°, for instance.

Step 1: SELC=0, MODE 1, and ALD is made active. - (L 2) is calculated, and a result is stored in the accumulator 51.

Step 2: BLD is made active. The content of the accumulator 51 is sent to the NBD register 53.

The next block line distance NBLD is calculated as follows when the rotation angle is 180°, for instance.

Step 1: SELC=0, MODE=1, and ALD is made active. -(L+2) is calculated, and a result is stored in the accumulator 51.

Step 2: SELA=0, SELB=0, and ALD is made active. -(L+2)YW is calculated, and a result is stored in the accumulator 51.

Step 3: LLD is made active. The content of the accumulator 51 is sent to the NBLD register 54.

Although a control device for the above steps is not shown in FIG. 13, it can be easily implemented as a wired logic, a microprogram, etc. provided in the head address calculating section 24.

Figure 14:
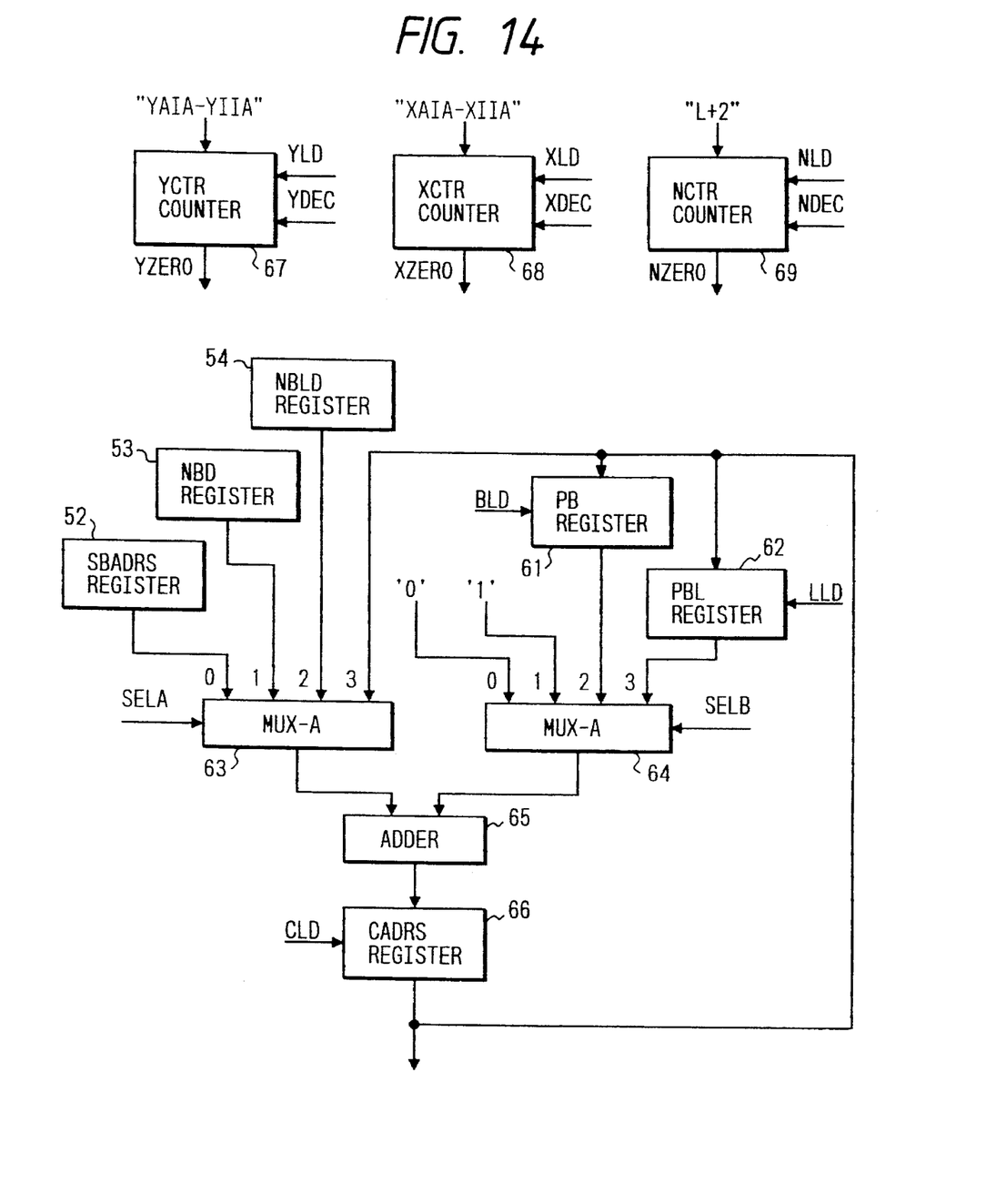
FIG. 14 is a block diagram showing a configuration of a current address calculating section.

FIG. 14 is a block diagram showing a configuration of the current address calculating section 25 (see FIG. 5). Values calculated in the head address calculating section 24 (see FIG. 13) are stored in the SBADRS register 52, NBD register 53 and NBLD register 54. When BLD is made active, a value (1-block preceding head address) of a CADRS register 66 is sent to a PB register 61. When LLD is made active, a value (1-block-line preceding head address) of a CADRS register 66 is sent to a PBL register 62. A current address for memory access is stored in the CADRS register 66. When CLD is made active, an output of an adder 65 is stored in the CADRS register 66.

A YCTR counter 67 counts the number of blocks in the Y direction of the image area IA (see FIG. 9). When YLD is made active, a value obtained by subtracting the minimum coordinate YIIA in the Y direction from the maximum coordinate YAIA in the Y direction is stored in the YCTR counter 67. When YDEC is made active, the value of the YCTR counter 67 is decremented by 1. When the count value of the YCTR counter 67 becomes 0, YZERO is made active. An XCTR counter 68 counts the number of blocks in the X direction of the image area IA. When XLD is made active, a value obtained by subtracting the minimum coordinate XIIA in the X direction from the maximum coordinate XAIA in the X direction is stored in the XCTR counter 68. When XDEC is made active, the value of the XCTR counter 68 is decremented by 1. When the count value of the XCTR counter 68 becomes 0, XZERO is made active. When NLD is made active, the number L+2 of bytes in one block is stored, as an initial value, in an NCTR counter 69. When NDEC is made active, the value of the NCTR counter is decremented by one. When the count value of the NCTR counter 69 becomes 0, NZERO is made active.

A multiplexer-A (abbreviated as MUX-A in FIG. 14) 63 outputs a value from the SBADRS register 52 when SELA=0, outputs a value from the NBD register 53 when SELA=1, outputs a value from the NBLD register 54 when SELA=2, and outputs a value from the CADRS register 66 when SELA=3. A multiplexer-B (abbreviated as MUX-B in FIG. 14) 64 outputs a fixed value "0" when SELB=0, outputs a fixed value "1" when SELB=1, outputs a value from the PB register 61 when SELB=2, and outputs a value from the PBL register 62 when SELB=3. The adder adds together values of the multiplexer-A 63 and the multiplexer-B 64.

Figure 15:
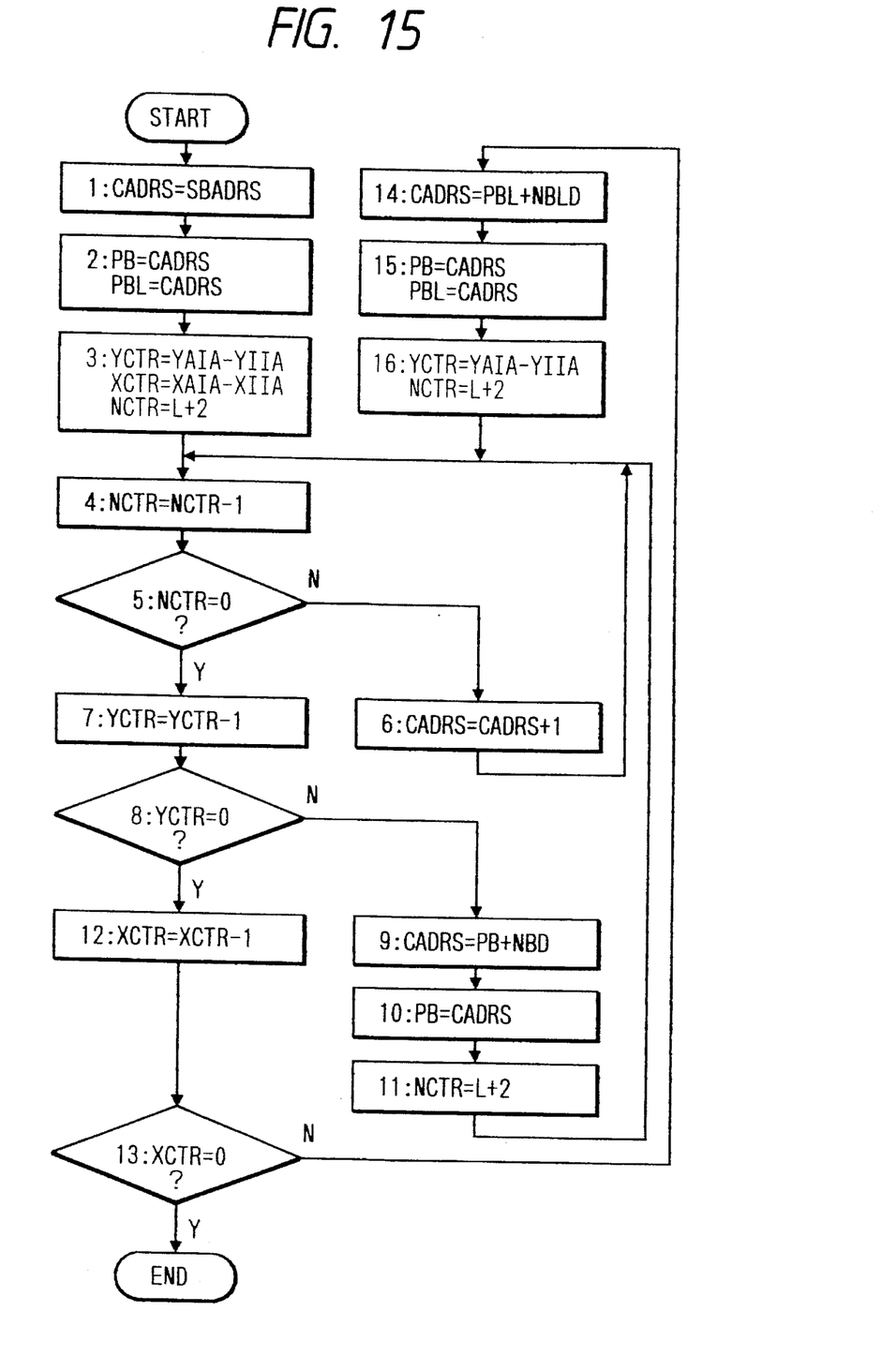
FIG. 15 is a flowchart showing an operation of the current address calculating section.

FIG. 15 is a flowchart showing the operation of the current address calculating section 25. A description will be made of how to calculate the current address CADRS.

Step 1: SELA=0, SELB=0, and CLD is made active. SBADRS+0 is calculated by the adder 65, and a result is stored in the CADRS register 66.

Step 2: BLD and LLD are made active. A value of the CADRS register 66 is sent to the PB register 61 and the PBL register 62.

Step 3: YLD, XLD and NLD are made active. A value of YAIA−YIIA is stored in the YCTR counter 67, a value of XAIA−XIIA is stored in the XCTR counter 68, and a value L+2 is stored in the NCTR counter 69.

Step 4: NDEC is made active. NCTR=NCTR−1 is calculated.

Step 5: A value of NZERO is read. If it is 0, branching to Step 7 is made. If it is not 0, branching to Step 6 is made.

Step 6: SELA=3, SELB=1, and CLD is made active. CADRS+1 is calculated by the adder 65, and a result is stored in the CADRS register 66.

Step 7: YDEC is made active. YCTR=YCTR−1 is calculated.

Step 8: A value of YZERO is read. If it is 0, branching to Step 12 is made. If it is not 0, branching to Step 9 is made.

Step 9: SELA=1, SELB=2, and CLD is made active. PB +NBD is calculated by the adder 65, and a result is stored in the CADRS register 66.

Step 10: BLD is made active. A value of the CADRS register 66 is stored in the PB register 61.

Step 11: NLD is made active. A value L+2 is stored in the NCTR counter 69. Branching to Step 4 is made.

Step 12: XDEC is made active. XCTR=XCTR−1 is calculated.

Step 13: A value of XZERO is read. If it is 0, the process is finished. If it is not 0, branching to Step 14 is made.

Step 14: SELA=2, SELB=3, and CLD is made active. PBL+NBLD is calculated is calculated by the adder 65, and a result is stored in the CADRS register 66.

Step 15: BLD and LLD are made active. A value of the CADRS register 66 is stored in the PB register 61 and the PBL register 62.

Step 16: YLD and NLD are made active. A value of YAIA–YIIA is stored in the YCTR counter 67, and a value L+2 is stored in the NCTR counter 69. Branching to Step 4 is made.

Although a control device for the above steps is not shown in FIG. 14, it can be easily implemented as a wired logic, a microprogram, etc. provided in the current address calculating section 25.

The above-described processing is summarized as follows.

(1) A head address SBADRS corresponding to an original image is calculated by the head address calculating section 24.

(2) A next block distance NBD and a next block line distance NBLD are calculated by the head address calculating section 24 in accordance with a rotation angle designated by the trimming designation device 5.

(3) A destination current address CADRES is calculated by the current address calculating section 25 based on the head address SBADRS, next block distance NBD and next block line distance NBLD given by the head address calculating section 24. Writing to the memory 8 is performed starting from the current address CADRS thus calculated.

As described above, according to the invention, since a location on the memory is designated by using X and Y coordinates rather than an address, the image processing device can accommodate variable length information and perform editing operations such as rotation and combining.

What is claimed is:

1. An image processing device for processing image information and area information associated therewith to form processed image information, the processed image information being stored into a memory, said device comprising:

means for connecting the image information and the associated area information to produce connected image information;

means for generating memory addresses so as to allow the connected image information to be stored into the memory through coordinates X and Y;

means for rotating the connected image information based on the memory addresses; and means for combining the rotated image information with the processed image information in the memory.

2. The image processing device of claim 1, further comprising means for dividing the image information into image blocks having a plurality of pixels adjacent to each other, and for coding the image information on a block-by-block basis, means for generating the associated area information which is divided into area blocks that have the same size as and are located at the same positions as the image blocks, and means for performing different operations on the image information by using the area information.

3. The image processing device of claim 2, wherein the dividing and coding means codes the image information such that all of the image blocks belonging to a single page are coded with a fixed code length and the image information is coded with varying code lengths for different pages.

4. The image processing device of claim 2, wherein the area information generating means generates the area information such that all of the area blocks belonging to a single page have a fixed data length.

5. The image processing device of claim 1, further comprising means for enabling the area information to be input to the device and output from the device in asynchronism with the image information.

6. The image processing device of claim 1, wherein the memory address generating means comprises means for calculating a head address of a block corresponding to values of the coordinates X and Y, and means for calculating distances in an X-axis direction and Y-axis direction of adjacent coordinate values from the head address of the block, and wherein the rotating means calculates rotated memory addresses for the connected image information rotated by an integer multiple of 90°.

7. The image processing device of claim 6, wherein the memory address generating means assigns connected image information memory addresses obtained by equally dividing, by N, a data length which is a sum of data lengths of the image information and the area information.

8. The image processing device of claim 1, further comprising means for including trimming designation information into the area information.

9. The image processing device of claim 8, wherein the combining means performs a combining operation with trimming on the memory based on the trimming designation information included in the area information.

10. An image processing device comprising:

an image input device for receiving an input image;

means for dividing the input image into image blocks;

means for coding the input image on a block-by-block basis with a fixed code length to produce coded image information;

means for performing a judgment relating to area separation between a character image and a picture image for area blocks that have the same size as and are located at the same positions as the image blocks, and for coding judgment results with another fixed code length to produce coded area information;

means for connecting the coded image information and the coded area information to produce connected information;

a memory for storing the connected information; and means for generating two-dimensional addresses of X and Y coordinates for blocks of the connected information, which addresses are independent of a connected code length of the connected information, and for writing and reading the connected information to and from the memory using the two dimensional addresses.

11. The image processing device of claim 10, further comprising means for editing, by performing an operation on the two-dimensional addresses, the connected information which is read from the memory using the two-dimensional addresses.

12. The image processing device of claim 11, wherein the editing means is rotating means.

13. An image processing device comprising:

an image input device for receiving an input image;

means for dividing the input image into image blocks;

means for defining representative points of the respective image blocks with respect to a document by two-dimensional coordinates X and Y;

means for coding the input image on a block-by-block basis with a fixed code length to produce coded image information;

means for performing a judgment relating to area separation between a character image and a picture image for area blocks that have the same size as and are located at the same positions as the image blocks, and for coding judgment results with another fixed code length to produce coded area information;

means for connecting the coded image information and the coded area information to produce connected information;

a memory for storing the connected information; and means for controlling writing and reading of the connected information to and from the memory, wherein the controlling means comprises means for correlating two-dimensional addresses of X and Y coordinates which correspond to the image blocks with the connected information, and means for performing writing and reading of blocks of the connected information to and from the memory using the two-dimensional addresses of X and Y coordinates.

* * * * *

UNITED STATES PATENT AND TRADEMARK OFFICE
CERTIFICATE OF CORRECTION

PATENT NO. : 5,557,715
DATED : September 17, 1996
INVENTOR(S) : Yoshio ICHIYANAGI It is certified that error appears in the above-indentified patent and that said Letters Patent is hereby corrected as shown below:

Claim 6, Column 10, Line 3, before "Y-axis", insert --a--.

Signed and Sealed this

Twenty-ninth Day of April, 1997

Attest:

BRUCE LEHMAN

Attesting Officer

Commissioner of Patents and Trademarks